United States Patent [19]

Kanaya

[11] Patent Number: 5,557,408
[45] Date of Patent: Sep. 17, 1996

[54] METHOD OF AND SYSTEM FOR MEASUREMENT OF DIRECTION OF SURFACE AND REFRACTIVE INDEX VARIATIONS USING INTERFERENCE FRINGES

[75] Inventor: Motonori Kanaya, Ohmiya, Japan

[73] Assignee: Fuji Photo Optical Co., Ltd., Saitama-ken, Japan

[21] Appl. No.: 406,364

[22] Filed: Mar. 17, 1995

[30]     Foreign Application Priority Data

Jun. 29, 1994   [JP]   Japan ................... 6-147477

[51] Int. Cl.$^6$ .................................................. G01B 9/02
[52] U.S. Cl. .......................... 356/359; 356/360; 356/361
[58] Field of Search ................................... 356/345, 349, 356/351, 357, 358, 359, 360, 361

[56]            References Cited

U.S. PATENT DOCUMENTS 4,632,554  12/1986  Pearce .............................. 356/351
4,759,628  7/1988  Tatsuno et al. .................... 356/360
5,129,724  7/1992  Brophy et al. ..................... 356/360

FOREIGN PATENT DOCUMENTS

0107966  8/1980  Japan ................................ 356/359

*Primary Examiner*—Samuel A. Turner
*Attorney, Agent, or Firm*—Brumbaugh, Graves Donohue & Raymond

[57]              ABSTRACT

A main measuring light having a first wavelength is projected onto a work and a reference surface to produce first interference fringes and a determination light having a second wavelength slightly different from the first wavelength is projected onto the work and the reference surface to produce second interference fringes. Whether the surface of the work is concave or convex, in which direction the surface inclines or the refractive index distribution of the work is determined on the basis of the relative positions of the first and second interference fringes.

6 Claims, 8 Drawing Sheets

METHOD OF AND SYSTEM FOR MEASUREMENT OF DIRECTION OF SURFACE AND REFRACTIVE INDEX VARIATIONS USING INTERFERENCE FRINGES

BACKGROUND OF THE INVENTION

1. Field of the Invention

This invention relates to a method of and a system for measuring fine surface conditions or refractive index distribution of a work such as an optical part or the like by observing interference fringes, and more particularly to a method of and a system for measurement by interference fringes which are used for inspecting in a manufacturing step of a work such as an optical part or the like whether the surface of the work has been ground into a predetermined shape or whether the work has a predetermined refractive index distribution.

2. Description of the Prior Art

Recently with improvement in manufacturing accuracy of mechanical, optical or semiconductor parts, there is a requirement for a technique for conveniently measuring the shape of a surface to be processed with a high accuracy during manufacturing steps thereof.

In such measuring techniques, there has been known a method in which interference of light is generated between the surface to be processed and a reference surface by an interferometer and the shape of the surface to be processed is measured by analyzing the interference fringes generated by the interference of light. In such a method, it is difficult to determine whether the surface is concave or convex at each part by simply observing the interference fringes.

Conventionally, the operator pushes the work to move up and down the surface to be processed relative to the reference surface to move the interference fringes and determines whether the surface is concave or convex at each part on the basis of the direction of movement of the interference fringes, e.g., leftward or rightward, or inward or outward.

However, though the conventional method permits to determine whether the surface is concave or convex at each part with ease, it is not satisfactory in accuracy since the operator pushes the work on a support in a predetermined position and the position of the support can be shifted by the force of the operator.

When a piezoelectric transducer or the like is used to push the work, the aforesaid problem on the accuracy of the measurement may be overcome. However this approach is disadvantageous in view of the cost since a piezoelectric transducer is required for each measuring system. Further there has been known a fringe scanning method in which the interference fringes are analyzed on the basis of change in brightness in a predetermined position generated by a fine distance movement of the work. However the fringe scanning method requires a large apparatus and providing such large apparatuses for various manufacturing steps is disadvantageous from the viewpoint of both the cost and the space.

Further, plastic lenses have been recently put into wide use. When plastic lenses are produced, resin orientation distribution fluctuates according to flow of the molten resin and in some lenses, density distribution (refractivity) can vary from part to part. Accordingly, molded plastic lenses must be screened on the basis of a predetermined standard. Measurement by interference fringes can be employed for the screening. Further there has been proposed a method of measuring refractive index distribution of gradient index lenses or crystal growth substances by interference fringes. In such a measurement, though the absolute values of refractive index differences can be easily detected, it is difficult to determine in which direction the refractive index increases or decreases.

SUMMARY OF THE INVENTION

In view of the foregoing observations and description, the primary object of the present invention is to provide a method of and a system for measurement by interference fringes which can easily measure whether the surface of a work is concave or convex at each part or in which direction the surface inclines with a high accuracy.

Another object of the present invention is to provide a method of and a system for measurement by interference fringes which can easily measure the refractive index distribution of a work with a high accuracy.

The method of measurement in accordance with a first aspect of the present invention comprises the steps of producing first interference fringes by projecting a main measuring light having a first wavelength onto a work and a reference surface, producing second interference fringes by projecting a determination light having a second wavelength slightly different from the first wavelength onto the work and the reference surface, and determining whether the surface of the work is concave or convex or in which direction the surface inclines on the basis of the relative positions of the first and second interference fringes.

The method of measurement in accordance with a second aspect of the present invention comprises the steps of producing first interference fringes by projecting a main measuring light having a first wavelength onto a work and a reference surface, producing second interference fringes by projecting a determination light having a second wavelength slightly different from the first wavelength onto the work and the reference surface, and determining the refractive index distribution of the work on the basis of the relative positions of the first and second interference fringes.

The interference fringes may be visually detected by the naked eye or through an optical instrument such as a microscope or may be automatically detected using a computer and an image taking system such as a CCD.

The measuring system for measuring a work on the basis of interference fringes in accordance with a third aspect of the present invention comprises a means for producing first interference fringes by projecting a main measuring light having a first wavelength onto the work and a reference surface, and a means for producing second interference fringes by projecting a determination light having a second wavelength slightly different from the first wavelength onto the work and the reference surface.

That the second wavelength is slightly different from the first wavelength means that the difference between the first and second wavelengths is such that the distance between the first interference fringes and the second interference fringes is smaller than a half of the spacing of the first interference fringes.

The main measuring light and the determination light may be emitted from separate sources or from one source. In the former case, the determination light may be projected onto the work and the reference surface at a predetermined timing so that the second interference fringes are formed only a predetermined period. In the latter case, the one source may be a semiconductor laser whose oscillation wavelength can be changed by changing the exciting current to change the energy band gap.

In accordance with the method of the present invention, the determination light for producing the second interference fringes has a wavelength slightly different from the wavelength of the main measuring light for producing the first interference fringes and accordingly the second interference fringes are formed near the first interference fringes of the same orders. By observing on which side of the first interference fringes the second interference fringes are formed, whether the surface is concave or convex or in which direction the surface inclines can be determined. This principle will be briefly described with reference to FIG. 9, hereinbelow.

Figure 9:
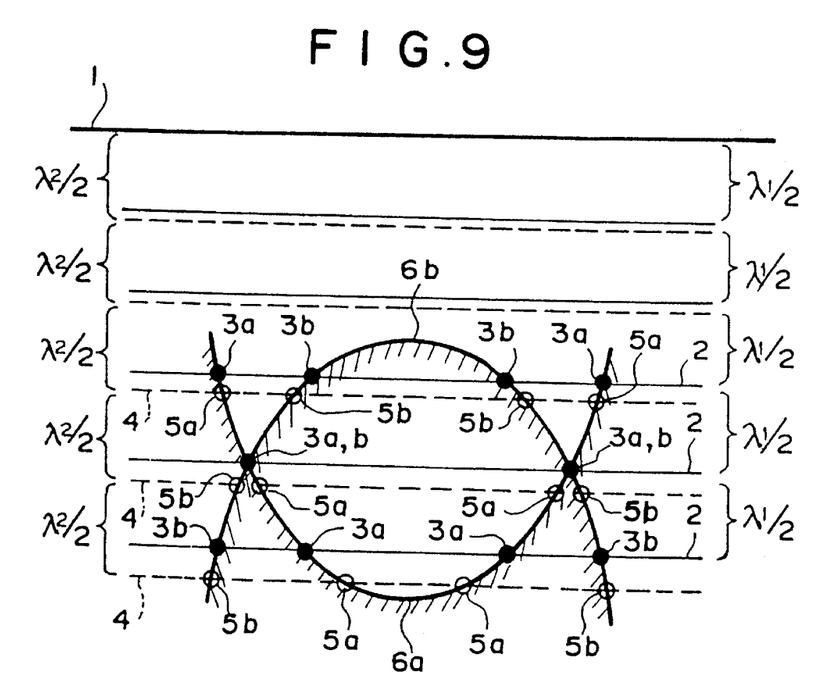
FIG. 9 is a schematic view for illustrating the principle of the present invention for determining the shape of a surface-to-be-measured or the refractive index distribution of a sample.

It has been known that in a Fizeau interferometer, dark and bright interference fringes are produced by interference of object light $L_O$ which is transmitted through a reference surface 1 and reflected by the surface to be measured and reference light $L_R$ which is reflected by the reference surface 1 and the pattern of the dark and bright interference fringes depends on the phase difference between the object light $L_O$ and the reference light $L_R$.

In FIG. 9, solid lines 2 arranged at intervals of $\lambda_1/2$ from the reference surface 1 respectively show positions where the phase difference between the object light $L_O$ and the reference light $L_R$ becomes $\lambda_1$, $2\lambda_1$, $3\lambda_1$ and so on when the surface to be measured is there. That is, when the surface is measured with a light beam of a wavelength of $\lambda_1$, a bright interference fringes are formed at the intersections of the surface to be measured and the solid lines 2. Dark interference fringes are formed at middles between the lines 2, that is, at distances of $\lambda_1/4$, $3\lambda_1/4$, $5\lambda_1/4$ and so on. Similarly, broken lines 4 arranged at intervals of $\lambda_2/2$ from the reference surface 1 respectively show positions where the phase difference between the object light $L_O$ and the reference light $L_R$ becomes $\lambda_2$, $2\lambda_2$, $3\lambda_2$ and so on when the surface to be measured is there. That is, when the surface is measured with a light beam of a wavelength of $\lambda_2$ which is slightly longer than $\lambda_1$, a bright interference fringes are formed at the intersections of the surface to be measured and the broken lines 4. Dark interference fringes are formed at middles between the lines 4, that is, at distances of $\lambda_2/4$, $3\lambda_2/4$, $5\lambda_2/4$ and so on. Line 6a represents a surface to be measured which is concave and line 6b represents a surface to be measured which is convex. When the surface to be measured is the concave surface 6a, the bright interference fringes by the light beam of a wavelength of $\lambda_1$ are formed at positions 3a and those by the light beam of a wavelength of $\lambda_2$ are formed at positions 5a which are slightly inside the positions 3a. When the surface to be measured is the convex surface 6b, the bright interference fringes by the light beam of a wavelength of $\lambda_1$ are formed at positions 3b and those by the light beam of a wavelength of $\lambda_2$ are formed at positions 5b which are slightly outside the positions 3b.

Accordingly, when the bright (or dark) interference fringes by the light beam of a wavelength of $\lambda_2$ are inside the bright (or dark) interference fringes by the light beam of a wavelength of $\lambda_1$, it is determined that the surface to be measured is concave, and when the bright (or dark) interference fringes by the light beam of a wavelength of $\lambda_2$ are outside the bright (or dark) interference fringes by the light beam of a wavelength of $\lambda_1$, it is determined that the surface to be measured is convex.

The determination of the refractive index distribution can be made in the similar manner.

That is, the bright (or dark) interference fringes by the light beam of a wavelength of $\lambda_2$ are formed on the lower-refractive-index side of the (or dark) interference fringes by the light beam of a wavelength of $\lambda_1$. For example, when the refractive index increases from the inside out, the bright (or dark) interference fringes by the light beam of a wavelength of $\lambda_2$ are formed inside the (or dark) interference fringes by the light beam of a wavelength of $\lambda_1$.

When the main measuring light and the determination light are emitted from different sources, the determination light may be projected only when the shape or inclination of the surface to be measured or the refractive index distribution of the work is to be observed, whereby analysis of the shape or inclination of the surface to be measured or the refractive index distribution of the work can be effected without being disturbed by the interference fringes by the determination light. Further by blinking the determination light when the shape or inclination of the surface to be measured or the refractive index distribution of the work is to be observed, it is facilitated to determine on which side of the first interference fringes (by the main measuring light) the second interference fringes (by the determination light) are formed.

When the main measuring light and the determination light are emitted from one source, the overall size of the system can be reduced and the cost can be lowered. Further when the one source is a semiconductor laser, the wavelength of output light can be easily changed by changing, for instance, the exciting current to change the energy band gap, the relative position of the first and second interference fringes can be easily observed, whereby determination of the shape or inclination of the surface to be measured or the refractive index distribution of the work is facilitated.

DESCRIPTION OF THE PREFERRED EMBODIMENT

Figure 1:
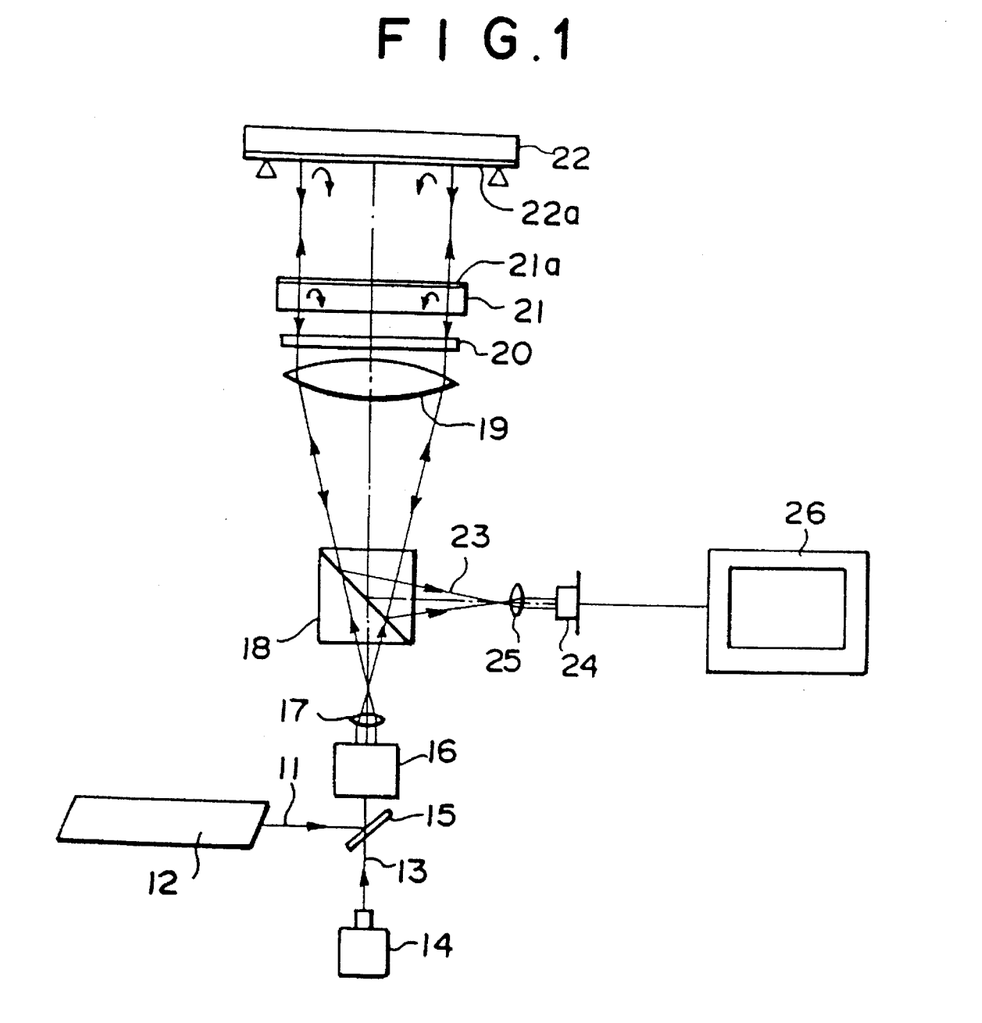
FIG. 1 is a schematic view of a system for measuring the shape of a surface in accordance with a first embodiment of the present invention in which a Fizeau interferometer is employed.

In FIG. 1, a system for measurement by interference fringes in accordance with an embodiment of the present invention comprises a He—Ne laser 12 which emits a main measuring light 11 having a first wavelength $\lambda_1$ (632.8 nm), a semiconductor laser 14 which emits a determination light 13 having a second wavelength $\lambda_2$ (690 nm), a half-silvered mirror 15 for combining the main measuring light 11 and the determination light 13 (the transmittivity to the determination light 13 is smaller than the reflectivity to the main measuring light 11), a beam expander 16 which expands the diameter of the combined light beam, a diverging lens 17, a polarizing beam splitter 18 which transmits the incident light and reflects the return light, a collimator lens 19, a quarter-wave plate 20, a reference plate 21 having a reference surface 21a which is optically flat, a CCD element 24 which receives return light carrying thereon information of interference fringes produced by interference of the light reflected by the reference surface 21a and the light reflected by a surface-to-be-measured 22a of a sample 22, and an imaging lens 25 provided in front of the CC element 25. The output signal of the CCD element 24 is input into a display system 26 which displays an image of the interference fringes. The quarter-wave plate 20 is provided in order to deflect the return light 23 toward the CCD element 24 by the polarizing beam splitter 18.

When the main measuring light 11 of $\lambda_1$ is projected onto the surface-to-be-measured 22a, first interference fringes are produced by interference of part of the main measuring light 11 reflected by the reference surface 21a and part of the main measuring light 11 reflected by the surface-to-be-measured 22a, and the return light 23 of the main measuring light 11 which carries information of the first interference fringes is focused on the CCD element 24. When the determination light 13 of $\lambda_2$ is projected onto the surface-to-be-measured 22a, second interference fringes are produced by interference of part of the determination light 13 reflected by the reference surface 21a and part of the determination light 13 reflected by the surface-to-be-measured 22a, and the return light 23 of the determination light 13 which carries information of the second interference fringes is focused on the CCD element 24. The output powers of the lasers 12 and 14 and the transmittivities to the main measuring light 11 and the determination light 13 of the half-silvered mirror 15 are set so that the intensity of the determination light 13 is greatly lower than that of the main measuring light 11.

Accordingly, images of the first and second interference fringes are displayed on the display system 26 with the image of the second interference fringes thinner than the image of the first interference fringes.

Figure 2A:
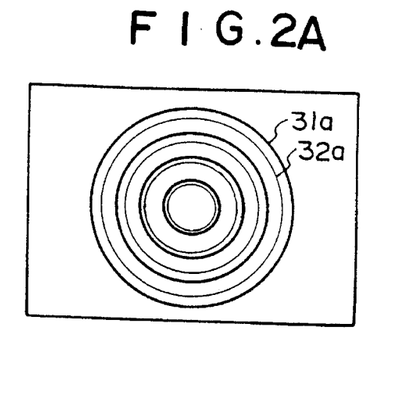
FIGS. 2A and 2B are schematic views showing examples of interference fringes obtained by the system shown in FIG. 1, FIGS. 3A and 3B are schematic views showing other examples of interference fringes obtained by the system shown in FIG. 1.
Figure 2B:
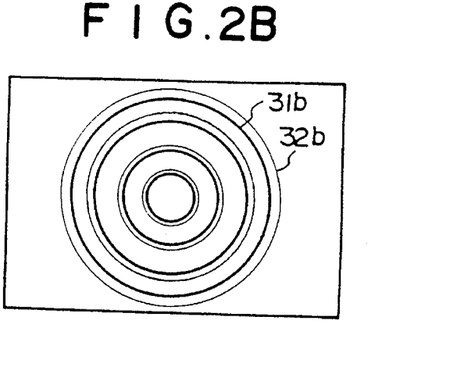

The wavelength $\lambda_2$ of the determination light 13 is slightly longer than the wavelength $\lambda_1$ of the main measuring light 11. Accordingly, as described above in conjunction with FIG. 9, when the surface-to-be-measured 22a is concave at the part in the field of view of the system, the second interference fringes 32a (shown by the thin line in FIGS. 2A and 2B for graphic purposes) by the determination light 13 appear inside the first interference fringes 31a (shown by the thick line in FIGS. 2A and 2B for graphic purposes) by the main measuring light 11 near thereto as shown in FIG. 2A, and when the surface-to-be-measured 22a is convex at the part in the field of view of the system, the second interference fringes 32b appear outside the first interference fringes 31b near thereto as shown in FIG. 2B.

Thus the operator can determine that the part of the surface-to-be-measured 22a in the field of view of the system is concave when the second interference fringes are inside the first interference fringes and that the part is convex when the former are outside the latter.

When the wavelength $\lambda_2$ of the determination light 13 is shorter than the wavelength $\lambda_1$ of the main measuring light 11, the second interference fringes appear outside the first interference fringes when the surface-to-be-measured 22a is concave at the part in the field of view of the system and inside the first interference fringes when the surface-to-be-measured 22a is convex at the part in the field of view of the system.

Figure 3A:
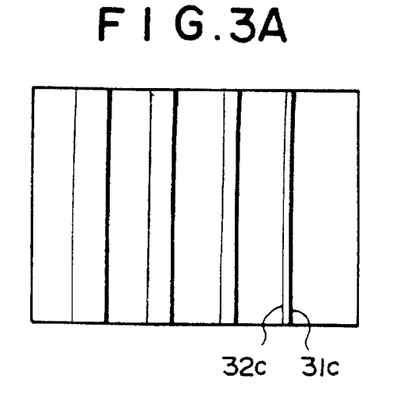
Figure 3B:
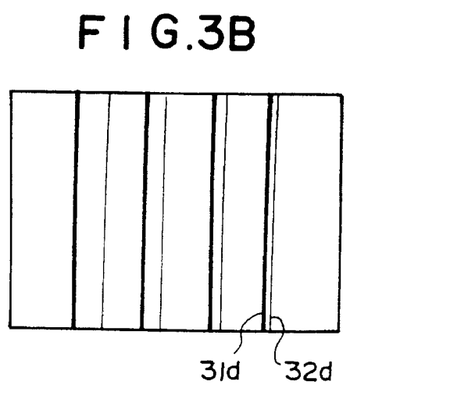

When a large concave portion or a convex portion is formed on the surface-to-be-measured 22a and the part in the field of view of the system inclines from one end of the field of view of the system to the other, the first and second interference fringes are in the form of parallel linear fringes (31c and 32c or 31d and 32d) as shown in FIGS. 3A and 3B and the second interference fringes appear on the left, right, upper or lower side of the first interference fringes according to the direction of the inclination.

When the relation between the relative positions of the first and second interference fringes and the shape of the surface-to-be-measured 22a is known in advance, the operator can determine the shape of the surface-to-be-measured 22a from the relative positions of the first and second interference fringes displayed on the display system 26.

When the method of the present invention is carried out by a Fizeau interferometer, the working distance of the operator can be large and the system is easy to handle since the coherence length is large in the Fizeau interferometer. However it sometimes becomes difficult to determine on which side of the first interference fringes the second interference fringes are produced since many interference fringes are produced in the Fizeau interferometer.

That is, in the embodiment described above, the difference between the wavelengths $\lambda_1$ (632.8 nm) and $\lambda_2$ (690 nm) is about 10% of the wavelength $\lambda_1$, and as the order of the interference fringes increases, the distance between the first and second interference fringes of the same order increases and at the tenth order, the distance increases up to about the thickness of one fringe. Accordingly when the determination is to be made on the basis of the relative positions of the interference fringes at a higher order, the relation between the shape of the surface-to-be-measured 22a and the relative positions of the first and second interference fringes of a desired order for the wavelengths $\lambda_1$ and $\lambda_2$ of the main measuring light 11 and the determination light 13 should be inspected in advance.

Not only the Fizeau interferometer but also various interferometers other than the Fizeau interferometer such as a Michelson interferomter and a Mach-Zehnder interferometer can be employed to carry out the method of the present invention.

Figure 4:
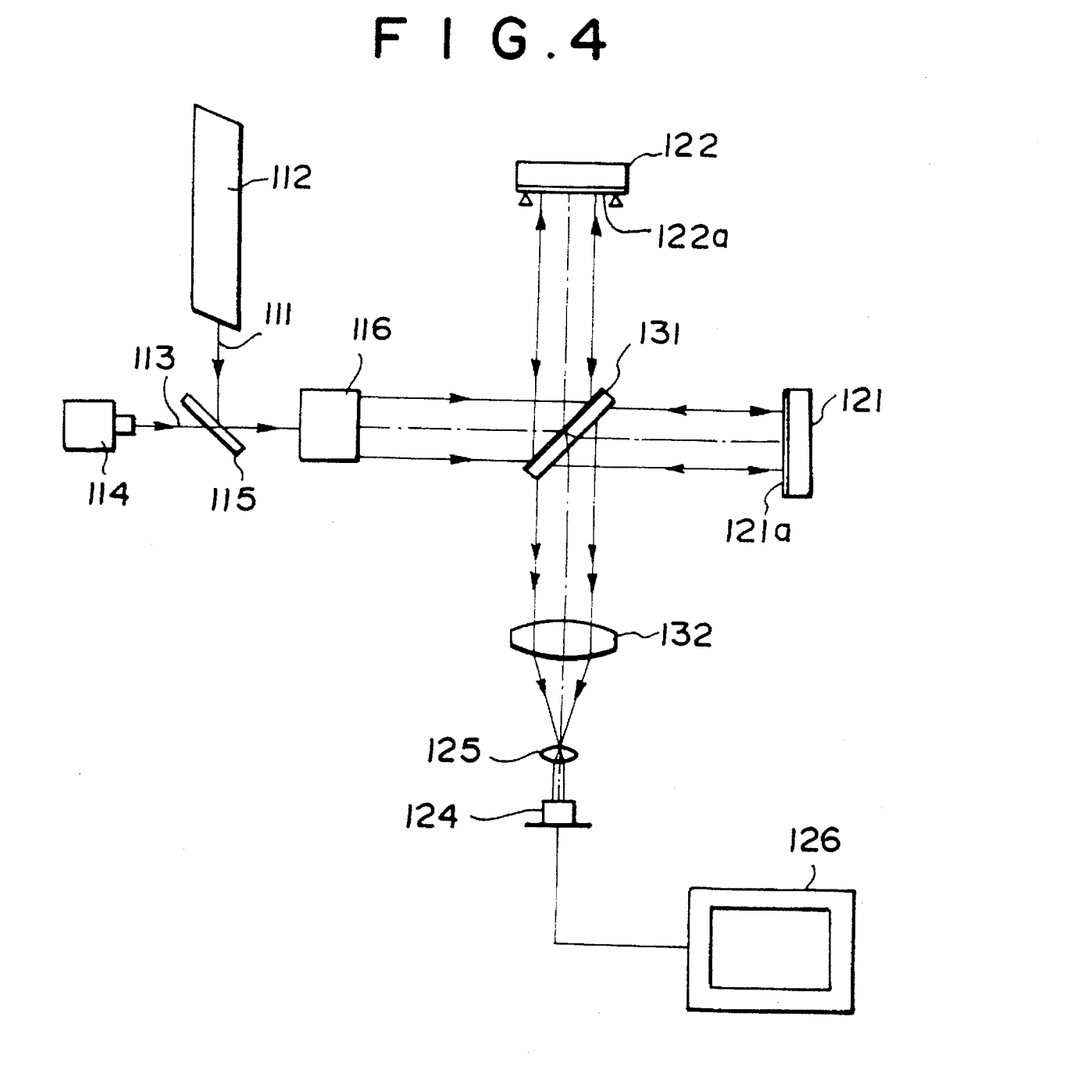
FIG. 4 is a schematic view of a system for measuring the shape of a surface in accordance with a second embodiment of the present invention in which a Michelson interferometer is employed.
Figure 5:
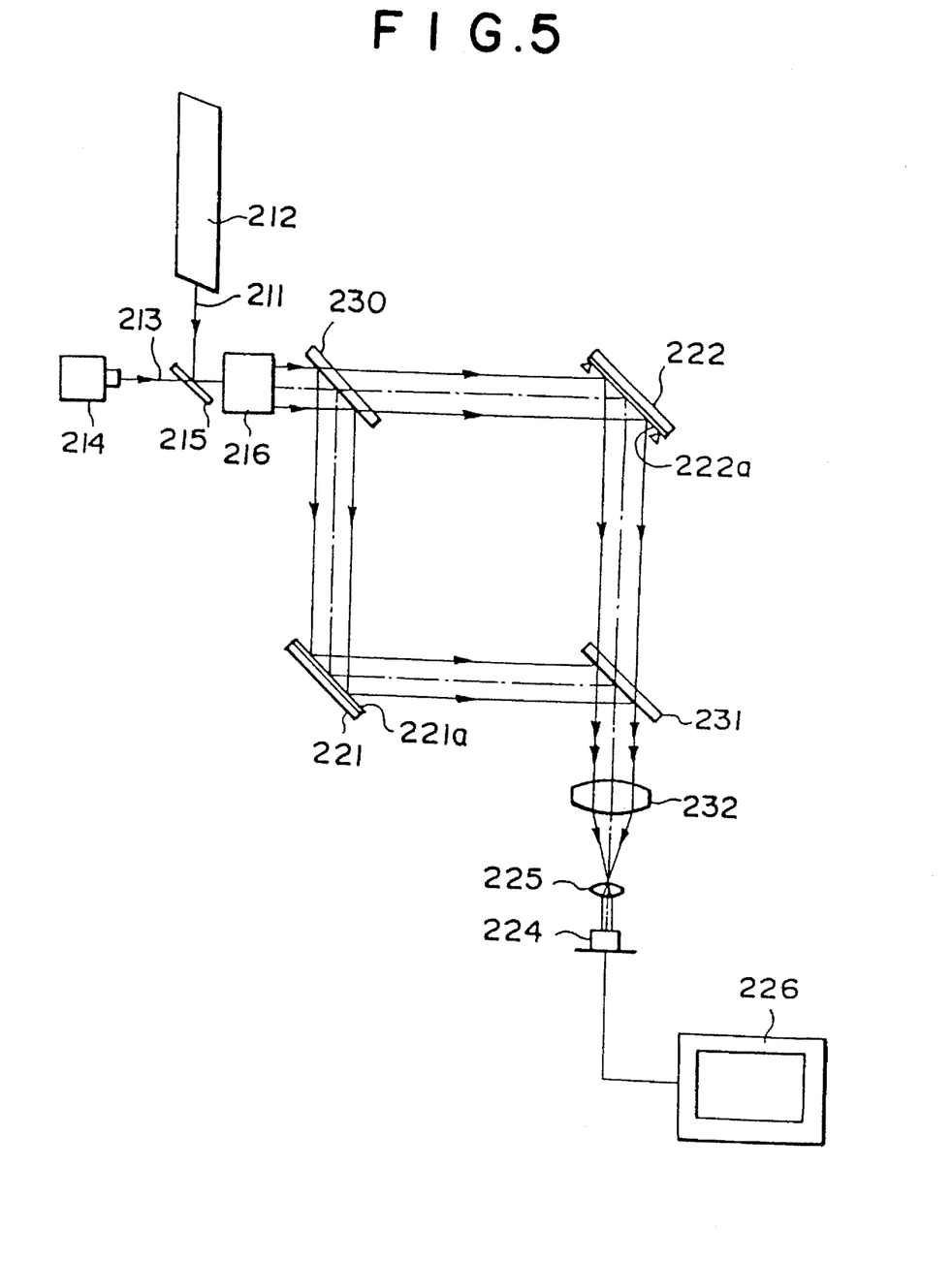
FIG. 5 is a schematic view of a system for measuring the shape of a surface in accordance with a third embodiment of the present invention in which a Mach-Zehnder interferometer is employed.

FIG. 4 shows a system for measurement by interference fringes in accordance with another embodiment of the present invention where a Michelson interferometer is employed and FIG. 5 shows a system for measurement by interference fringes in accordance with still another embodiment of the present invention where a Mach-Zehnder interferometer is employed. In FIG. 4, the parts analogous to those in FIG. 1 are given the reference numerals obtained by adding 100 to the reference numerals in FIG. 1 and in FIG. 5, the parts analogous to those in FIG. 1 are given the reference numerals obtained by adding 200 to the reference numerals in FIG. 1.

In the system shown in FIG. 4, main measuring light 111 emitted from a He—Ne laser 112 is combined with a determination light 113 emitted from a semiconductor laser 114 by a half-silvered mirror 115 (the transmittivity to the determination light 113 is smaller than the reflectivity to the main measuring light 111) and is expanded by a beam expander 116. A half of the combined light is transmitted through a half-silvered mirror 131 toward a reference surface 121a of a reference plate 121 and the other half is reflected by the half-silvered mirror 131 toward a surface-to-be-measured 122a of a sample 122. The laser beam reflected by the reference surface 121a and further reflected by the half-silvered mirror 131 interferes with the laser beam reflected by the surface-to-be-measured 122a and transmitted through the half-silvered mirror 131. The light which carries information of the interference fringes is focused on the CCD element 124 through a collimator lens 132 and an imaging lens 125. The output signal of the CCD element 124 is input into a display system 126 which displays an image of the interference fringes.

The image of the first and second interference fringes thus obtained is similar to that obtained in the first embodiment shown in FIGS. 2A, 2B 3A or 3B.

In the system shown in FIG. 5, the main measuring light and the determination light are caused to obliquely impinge upon the reference surface and the surface-to-be-measured to lower the sensitivity and accordingly the interferometer employed in the system should be called a "modified Mach-Zehnder interferometer. In the system shown in FIG. 5, main measuring light 211 emitted from a He—Ne laser 212 is combined with a determination light 213 emitted from a semiconductor laser 214 by a half-silvered mirror 215 (the transmittivity to the determination light 213 is smaller than the reflectivity to the main measuring light 211) and is expanded by a beam expander 216. A half of the combined light is reflected by a half-silvered mirror 230 toward a reference surface 221a of a reference plate 221 and the other half is transmitted through the half-silvered mirror 230 toward a surface-to-be-measured 222a of a sample 222. The reference surface 221a and the surface-to-be-measured 222a are inclined so that the lights obliquely impinge upon them. The laser beam reflected by the reference surface 221a and further reflected by a half-silvered mirror 231 interferes with the laser beam reflected by the surface-to-be-measured 222a and transmitted through the half-silvered mirror 231. The light which carries information of the interference fringes is focused on the CCD element 224 through a collimator lens 232 and an imaging lens 225. The output signal of the CCD element 224 is input into a display system 226 which displays an image of the interference fringes.

The image of the first and second interference fringes thus obtained is similar to that obtained in the first embodiment shown in FIGS. 2A, 2B 3A or 3B.

The refractive index distribution of a work can be measured by a system similar to those in the preceding embodiments.

Figure 6:
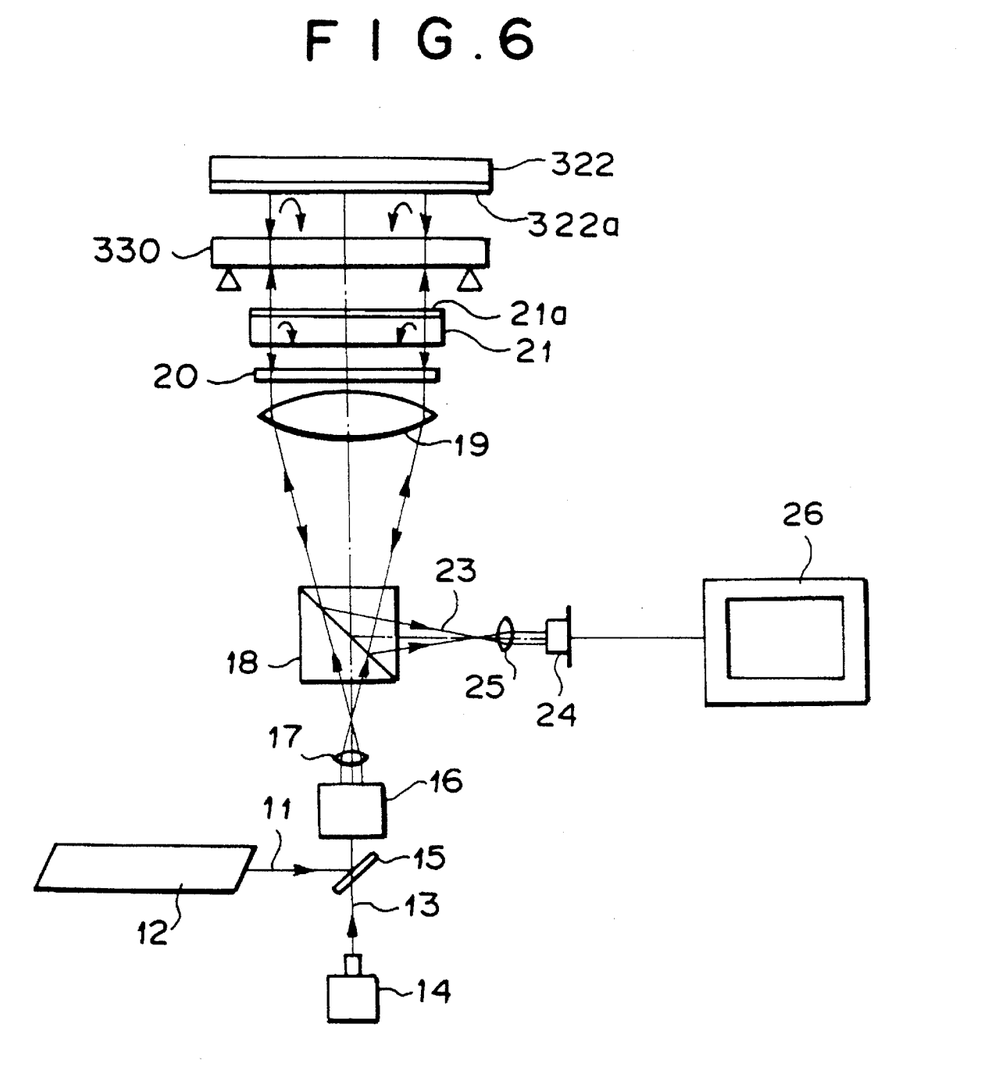
FIG. 6 is a schematic view of a system for measuring the refractive index distribution of a sample in accordance with a fourth embodiment of the present invention in which a Fizeau interferometer is employed.

The system for measuring the refractive index distribution shown in FIG. 6 is substantially the same as the system shown in FIG. 1 except that a flat reflecting mirror 322 is disposed in the position of the sample 22 in the system of FIG. 1 and a transparent sample 330 whose refractive index distribution is to be measured is disposed between the reflecting surface 322a of the reflecting mirror 322 and the reference surface 21a.

Since part of the main measuring light 11 and the determination light 13 transmitted through the reference surface 21a and reflected by the reflecting surface 322a pass through the sample 330 twice, the object lights which returns to the reference surface 21a carry double the actual refractive index distribution of the sample 330.

The parts of the main measuring light 11 and the determination light 13 reflected by the reflecting surface 322a respectively interfere with the parts of the main measuring light 11 and the determination light 13 reflected by the reference surface 21a and the first and second interference fringes are produced and an image of the first and second interference fringes are displayed by the display system 26.

When the refractive index of the part in the field of view of the system decreases toward the inside of the part, the second interference fringes 32a by the determination light 13 appear inside the first interference fringes 31a by the main measuring light 11 near thereto as shown in FIG. 2A, and when the refractive index of the part in the field of view of the system increases toward the inside of the part, the second interference fringes 32a appear outside the first interference fringes 31a near thereto as shown in FIG. 2B.

When refractive index of the part in the field of view of the system increases or decreases from one end of the field of view of the system to the other, the first and second interference fringes are in the form of parallel linear fringes as shown in FIGS. 3A and 3B and the second interference fringes appear on the left, right, upper or lower side of the first interference fringes according to the direction of change of the refractive index.

Figure 7:
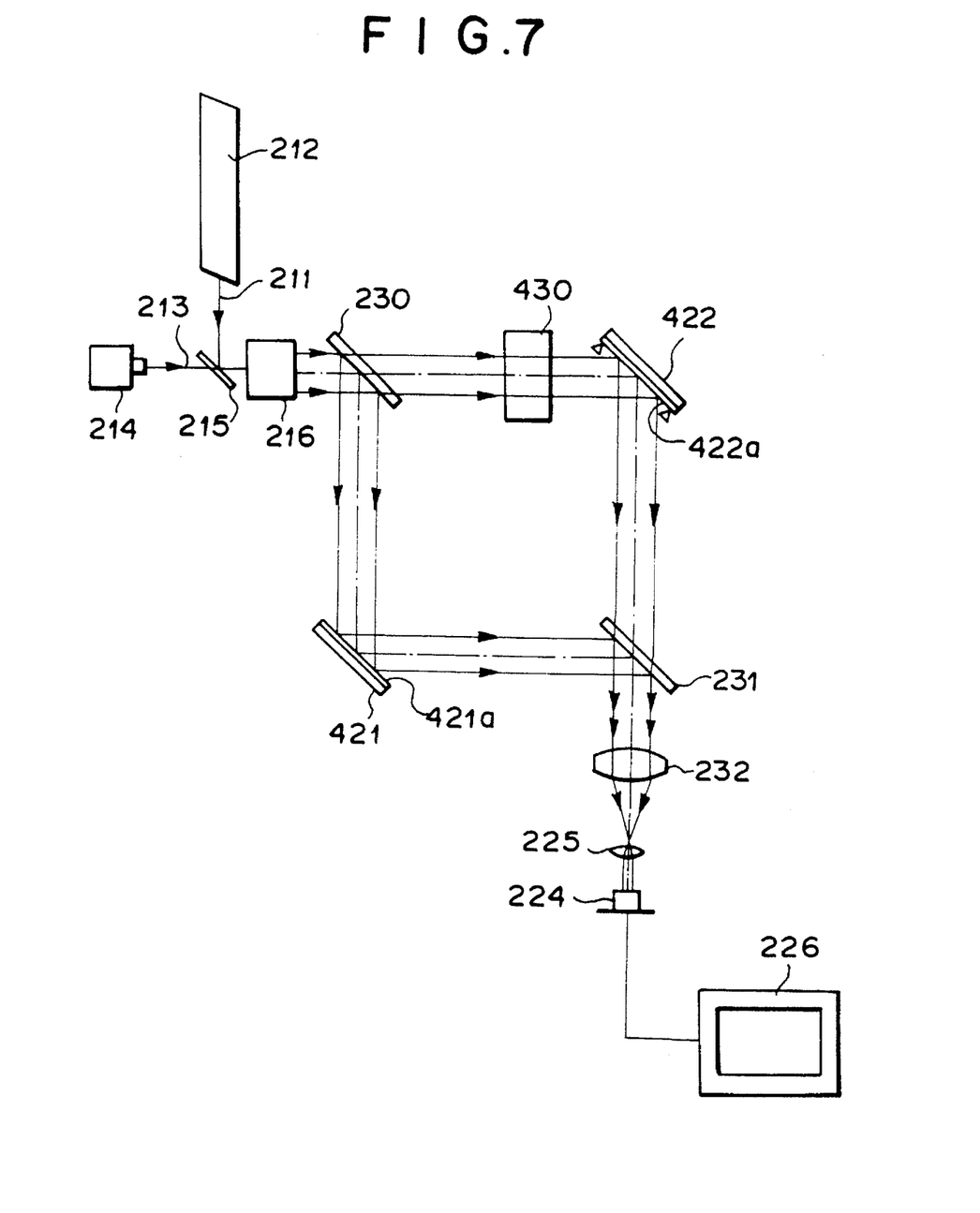
FIG. 7 is a schematic view of a system for measuring the refractive index distribution of a sample in accordance with a fifth embodiment of the present invention in which a Mach-Zehnder interferometer is employed.

The system for measuring the refractive index distribution shown in FIG. 7 is substantially the same as the system shown in FIG. 5 except that flat reflecting mirrors 421 and 422 are disposed respectively in the positions of the reference plate 221 and the sample 222 in the system of FIG. 5 and a transparent sample 430 whose refractive index distribution is to be measured is disposed between the half-silvered mirror 230 and the reflecting surface 422a of the mirror 422. The sample 430 may be disposed between the half-silvered mirror 230 and the reflecting surface 421a of the mirror 421, between the half-silvered mirror 231 and the reflecting surface 421a of the mirror 421 or between the half-silvered mirror 231 and the reflecting surface 422a of the mirror 422.

The object lights or the lights (the main measuring light 211 or the determination light 213) passing through the sample 430 are reflected by the mirror 422 to reach the half-silvered mirror 231 and interfere respectively with the reference lights which reach the half-silvered mirror 231 by way of the mirror 421, whereby the first and second interference fringes are displayed by the display system 226.

In this system, the refractive index distribution of the sample 430 is determined in the manner similar to that in the system shown in FIG. 6.

In the embodiments shown in FIGS. 6 and 7, when the object lights carry information on the shape of the surface of the sample 330 or 430, it becomes difficult to analyze only the refractive index distribution. Accordingly it is preferred that the light entrance face and the light exit face of the sample be planar as well as possible.

Generally the Michelson interferometer and the Mach-Zehnder interferometer are long in the coherence length as compared with the Fizeau interferometer, and especially when a light source having a short coherence length is employed, the number or order of the interference fringes is small and accordingly, the gap between the first and second interference fringes of the same order can be limited within a predetermined range (e.g., up to a half of the thickness of one fringe), whereby the relative positions of the first and second interference fringes can be easily determined without taking into account the relation between the position of the work and the wavelength (and with the order of the interference fringes to be observed) and determination of the shape of the surface-to-be-measured or the refractive index distribution of the work is facilitated.

Figure 8:
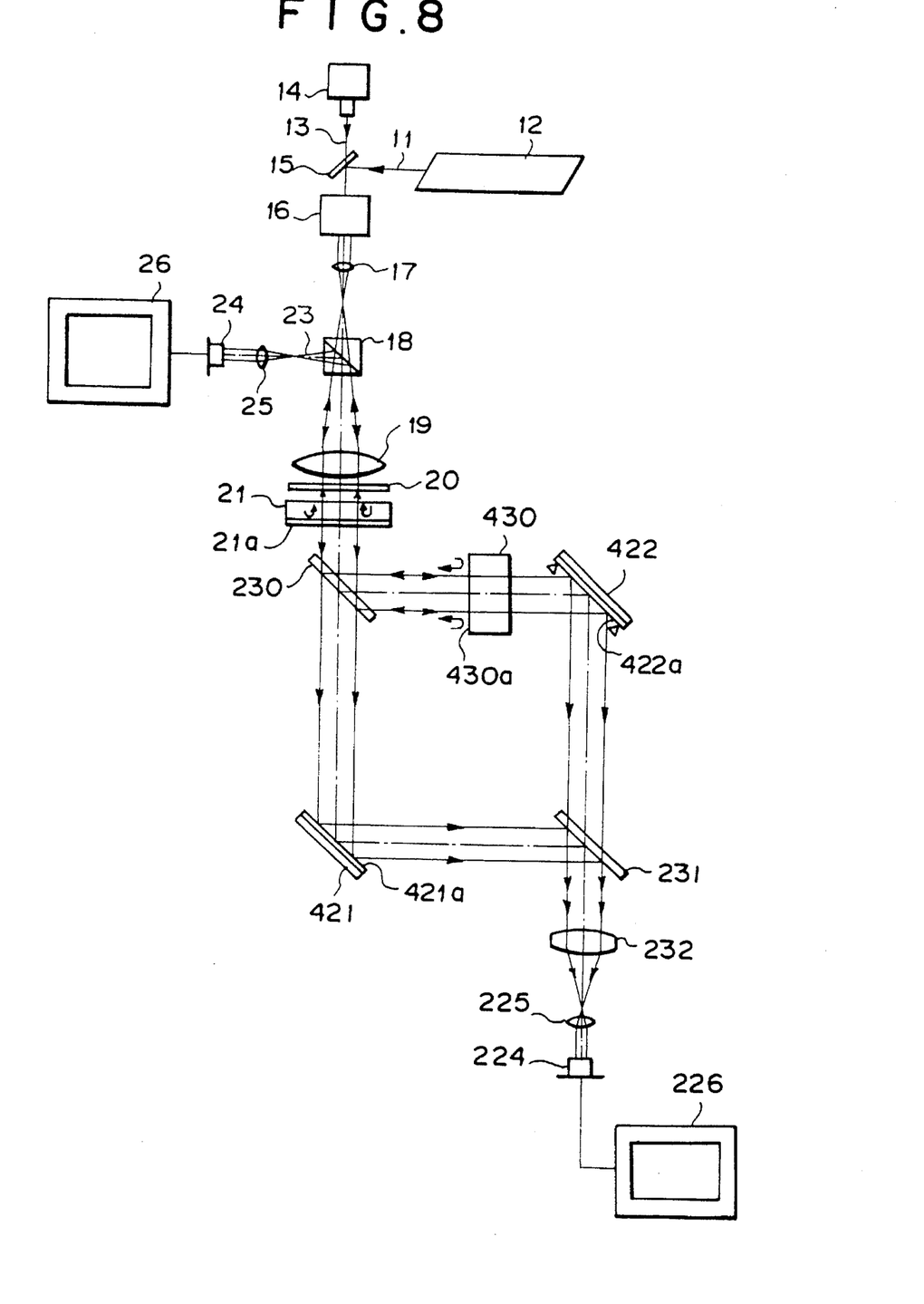
FIG. 8 is a schematic view of a system for measuring both the shape of a surface of a sample and the refractive index distribution of the sample in accordance with a sixth embodiment of the present invention in which a Fizeau interferometer and Mach-Zehnder interferometer are employed.

In the system shown in FIG. 8, the shape of the surface-to-be-measured of a work and the refractive index distribution of the work can be simultaneously measured. The system shown in FIG. 8 is obtained by combining the system shown in FIG. 1 employing a Fizeau interferometer and the system shown in FIG. 7 employing a Mach-Zehnder interferometer, and the shape of a surface-to-be-measured 430a of a sample 430 is measured by the portion of the Fizeau interferometer while the refractive index distribution of the work 430 is measured by the portion of the Mach-Zehnder interferometer. That is, the system includes a single main measuring light source (laser 12) and a single determination light source (laser 14) and the shape of the surface-to-be-measured 430a is measured by the interference fringes in reflection while the refractive index distribution is measured by the interference fringes in transmission. In FIG. 8, the parts analogous to those shown in FIG. 1 are given the same reference numerals as employed in FIG. 1 and the parts analogous to those shown in FIG. 7 are given the same reference numerals as employed in FIG. 7.

In order to improve the measuring accuracy in the system shown in FIG. 8, the surface accuracy of the half-silvered mirror 230 is especially important.

The method and system of the present invention need not be limited to the embodiments described above but the embodiments may be variously modified.

For example, a shutter may be provided between the determination light source (the semiconductor laser) and the half-silvered mirror and may be opened and closed at a predetermined timing so that the second interference fringes are produced only when the shape of the surface or the refractive index distribution is to be determined. Further the determination light source may be turned on and off at a predetermined timing so that the second interference fringes are blinked to facilitate for the operator to recognize the position of the second interference fringes.

Though in the embodiments described above, the main measuring light and the determination light are emitted from separate sources, the main measuring light and the determination light may be emitted from one source. For example, when a dye laser with a grating for wavelength selection or a semiconductor laser whose oscillation wavelength can be changed, for instance, by changing the exciting current is employed, it is possible to emit a pair of light beams having different wavelengths from a single source. When the semiconductor laser is employed, the main measuring light may be first emitted to produce the first interference fringes and then the determination light may be emitted to produce the second interference fringes. The display system may be provided with a memory to store the first and second interference fringes and to display the images of the first and second interference fringes alternately or simultaneously.

Further though in the embodiments described above, the images of the first and second interference fringes are displayed by a display system, the images may be projected on a screen.

Further though in the embodiments described above, the operator determines the relative positions of the first and second interference fringes, it is possible to arrange the system to automatically determine the relative positions according to a pattern recognition program on the basis of the interference fringe information stored in a memory.

What is claimed is:

1. A method of measuring the shape of a surface of a work comprising the steps of producing first interference fringes by projecting a main measuring light having a first wavelength onto a work and a reference surface, producing second interference fringes by projecting a determination light having a second wavelength slightly different from the first wavelength onto the work and the reference surface, and determining whether the surface of the work is concave or convex or in which direction the surface inclines on the basis of the relative positions of the first and second interference fringes.

2. A method of measuring the refractive index distribution of a work comprising the steps of producing first interference fringes by projecting a main measuring light having a first wavelength onto a work and a reference surface, producing second interference fringes by projecting a determination light having a second wavelength slightly different from the first wavelength onto the work and the reference surface, and determining the refractive index distribution of the work on the basis of the relative positions of the first and second interference fringes.

3. A measuring system for measuring variations in a surface or an index of refraction of a work on the basis of interference fringes comprising a means for producing first interference fringes by projecting a main measuring light having a first wavelength onto the work and a reference surface, a means for producing second interference fringes by projecting a determination light having a second wavelength slightly different from the first wavelength onto the work and the reference surface, and means for detecting the relative positions of the first and second interference fringes to indicate whether a surface of the work is concave or convex or a direction of inclination of a surface of the work or a direction of change of a refractive index of the work on the basis of the relative positions of the first and second interference fringes.

4. A measuring system as defined in claim 3 in which the main measuring light and the determination light are emitted from separate sources and the determination light is projected onto the work and the reference surface at a predetermined timing.

5. A measuring system as defined in claim 3 in which the main measuring light and the determination light are emitted from one light source.

6. A measuring system as defined in claim 5 in which said one light source is a semiconductor laser whose oscillation wavelength is variable.

\* \* \* \* \*